US010283860B2

(12) United States Patent
Tanaka

(10) Patent No.: US 10,283,860 B2
(45) Date of Patent: May 7, 2019

(54) ANTENNA DEVICE AND ANTENNA DEVICE CONTROL METHOD

(71) Applicant: NEC Corporation, Tokyo (JP)

(72) Inventor: Nobuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/115,062

(22) PCT Filed: Jan. 30, 2015

(86) PCT No.: PCT/JP2015/000418
§ 371 (c)(1),
(2) Date: Jul. 28, 2016

(87) PCT Pub. No.: WO2015/122142
PCT Pub. Date: Aug. 20, 2015

(65) Prior Publication Data
US 2016/0352009 A1  Dec. 1, 2016

(30) Foreign Application Priority Data
Feb. 17, 2014 (JP) ................. 2014-027795

(51) Int. Cl.
*H01Q 1/12* (2006.01)
*H01Q 3/20* (2006.01)
(Continued)

(52) U.S. Cl.
CPC ............ *H01Q 3/20* (2013.01); *H01Q 1/1257* (2013.01); *H01Q 15/16* (2013.01); *H01Q 19/13* (2013.01); *H04W 88/08* (2013.01)

(58) Field of Classification Search
CPC ...... H01Q 15/16; H01Q 19/13; H01Q 1/1257; H01Q 3/20; H01Q 1/12
See application file for complete search history.

(56) References Cited

U.S. PATENT DOCUMENTS 2,585,579 A    2/1952  Norden
3,497,697 A *  2/1970  Vourgourakis .......... G01S 3/786
                                                  250/203.3
(Continued)

FOREIGN PATENT DOCUMENTS

EP        921590 A2    6/1999
JP    H07-249917 A    9/1995
(Continued)

OTHER PUBLICATIONS

Debruin, James, "Control Systems for Mobile Satcom Antennas: Establishing and Maintaining High-Bandwidth Satellite Links During Vehicle Motion," IEEE Control Systems Magazine, pp. 86-101 (Feb. 2008).
(Continued)

*Primary Examiner* — Tho G Phan
(74) *Attorney, Agent, or Firm* — Wilmer Cutler Pickering Hale and Dorr LLP

(57) ABSTRACT

An antenna device (100) according to the present invention includes a primary radiation means (10) for guiding and emitting radio waves at transmission, and guiding radio waves at reception, an antenna member (20) for reflecting radio waves emitted by the primary radiation means (10) and forming a transmission beam at transmission, and reflecting received waves on the primary radiation means (10) at reception, an angle adjustment means (40) for changing a relative angle between the primary radiation means (10) and the antenna member (20), an angle calculation means (81) for calculating the relative angle to be formed between the primary radiation means (10) and the antenna member (20) for displacement of an azimuth occurring in the primary radiation means (10), and a control means (82) for controlling the angle adjustment means based on the calculated relative angle.

6 Claims, 10 Drawing Sheets

(51) Int. Cl.
*H01Q 15/16* (2006.01)
*H01Q 19/13* (2006.01)
*H04W 88/08* (2009.01)

(56) References Cited

U.S. PATENT DOCUMENTS

| | | | |
|---|---|---|---|
| 3,898,668 A | 8/1975 | Evans et al. | |
| 4,873,534 A * | 10/1989 | Wohlleben | H01Q 13/065 343/761 |
| 5,714,960 A * | 2/1998 | Choi | H01Q 3/18 343/761 |
| 6,016,122 A * | 1/2000 | Malone | H01P 1/18 333/159 |
| 6,052,099 A * | 4/2000 | Imaizumi | H01Q 1/247 343/840 |
| 7,839,348 B2 * | 11/2010 | Baker | H01Q 1/125 343/757 |
| 2004/0066327 A1 * | 4/2004 | Salmon | G01K 11/006 342/351 |
| 2005/0219138 A1 | 10/2005 | Obert et al. | |
| 2008/0112065 A1 | 5/2008 | Wo et al. | |
| 2008/0309569 A1 | 12/2008 | Berejik | |
| 2009/0273850 A1 | 11/2009 | Wo et al. | |
| 2011/0007407 A1 | 1/2011 | Wo et al. | |
| 2011/0156948 A1 | 6/2011 | Berejik | |
| 2011/0176228 A1 | 7/2011 | Wo et al. | |
| 2015/0138022 A1 * | 5/2015 | Takahashi | H01Q 1/12 343/757 |

FOREIGN PATENT DOCUMENTS

| | | |
|---|---|---|
| JP | 3109584 B2 | 11/2000 |
| JP | 2007-129624 A | 5/2007 |

OTHER PUBLICATIONS

Extended European Search Report issued by the European Patent Office for European Application No. 15748643.2 dated Sep. 19, 2017 (13 pages).
International Search Report corresponding to PCT/JP2015/000418, dated Mar. 24, 2015, 3 pages.

* cited by examiner

ANTENNA DEVICE AND ANTENNA DEVICE CONTROL METHOD

CROSS-REFERENCE TO RELATED APPLICATIONS

This application is a national stage application of International Application No. PCT/JP2015/000418 entitled "ANTENNA DEVICE AND ANTENNA DEVICE CONTROL METHOD," filed on Jan. 30, 2015, which claims the benefit of the priority of Japanese Patent Application No. 2014-027795 filed on Feb. 17, 2014, the disclosures of each of which are hereby incorporated by reference in their entirety.

TECHNICAL FIELD

The present invention relates to an antenna device and an antenna device control method and, particularly, to an antenna device and an antenna device control method that adjust the azimuth of an antenna.

BACKGROUND ART

A wireless communication system that wirelessly communicates between a wireless base station and another wireless base station without using a communication cable is known. An opposite antenna having directionality is used for this communication. To perform communication using a directional antenna, it is important that the antenna is always oriented in an appropriate direction to maximize the reception level. However, even when the antenna is set up in an appropriate direction, there are various factors to cause a change in the direction of the antenna by environmental effects after the installation, such as the deformation of an antenna installation base due to high winds or sunshine, earthquake shock or the like, for example.

Patent Literature 1 (Japanese Unexamined Patent Application Publication No. 2007-129624) discloses the antenna that detects a wind direction and a wind speed and controls the direction. The antenna disclosed in Patent Literature 1 includes a wind direction and speed calculation unit that measures a wind direction and a wind speed and a displacement estimation unit that, after the calculation, estimates an antenna orientation error due to the displacement of the antenna. The antenna is then driven toward a target direction so as to correct the error based on the calculation result. Thus, even when the antenna is displaced due to wind, it is possible to correct the orientation of the antenna to an appropriate direction.

CITATION LIST

Patent Literature

PTL1: Japanese Unexamined Patent Application Publication No. 2007-129624

SUMMARY OF INVENTION

Technical Problem

In recent years, to meet a demand for high-speed and high-capacity communication, signals used for wireless communication occupy larger bandwidth with the development of high frequency devices, and carrier frequency increases to a microwave range. Further, in P2P (peer to peer) communication also, microwave communication using an opposite antenna is pursued. When a directional antenna is used to implement the microwave communication, the width of an antenna beam is significantly narrowed.

Accordingly, the beam width is about 0.3° in E-band (2 ft, 80 GHz) wireless communication, for example. If the beam width is narrowed like this, the reception level is significantly lowered even with only small displacement of the antenna during communication, which can cause line disconnection. Because a communication infrastructure such as a wireless base station needs to maintain communication even under severe environment or in the event of disaster such as earthquake, the direction control of a directional antenna is an issue to be solved.

A large antenna for astronomical observation or the like is assumed as the antenna disclosed in Patent Literature 1. The system that detects a wind direction and a wind speed and controls the antenna direction described in Patent Literature 1 is not applicable to wireless communication using microwaves with a very narrow beam width which requires fine adjustment of the antenna angle.

An exemplary object of the present invention is to provide an antenna device and an antenna device control method that can adjust the antenna position highly accurately and maintain a high transmission and reception level even under the environment like high winds or a disaster where the azimuth of the antenna changes.

Solution to Problem

An antenna device according to an exemplary aspect of the present invention includes a primary radiation means for guiding and emitting radio waves at transmission, and guiding radio waves at reception, an antenna member for reflecting radio waves emitted by the primary radiation means and forming a transmission beam at transmission, and reflecting received waves on the primary radiation means at reception, an angle adjustment means for changing a relative angle between the primary radiation means and the antenna member, an angle calculation means for calculating the relative angle to be formed between the primary radiation means and the antenna member for displacement of an azimuth occurring in the primary radiation means, and a control means for controlling the angle adjustment means based on the calculated relative angle.

A control method of an antenna device according to an exemplary aspect of the present invention is a control method of an antenna device including a primary radiation means for guiding and emitting radio waves at transmission, and guiding radio waves at reception, an antenna member for reflecting radio waves emitted by the primary radiation means and forming a transmission beam at transmission, and reflecting received waves on the primary radiation means at reception, an angle adjustment means for changing a relative angle between the primary radiation means and the antenna member, an angle calculation means for calculating the relative angle to be formed between the primary radiation means and the antenna member for displacement of an azimuth occurring in the primary radiation means, and a control means for controlling the angle adjustment means based on the calculated relative angle, the method including calculating the relative angle to be formed between the primary radiation means and the antenna member for displacement of an azimuth occurring in the primary radiation means, and controlling the angle adjustment means based on the calculated relative angle.

Advantageous Effects of Invention

According to an exemplary embodiment of the present invention, it is possible to provide an antenna device and an antenna device control method that can adjust the antenna position highly accurately and maintain a high transmission and reception level even under the environment like high winds or a disaster where the azimuth of the antenna changes.

DESCRIPTION OF EMBODIMENTS

First Exemplary Embodiment

The structure of an antenna device 100 according to a first exemplary embodiment of the present invention is described hereinafter with reference to the drawings.

Figure 1:
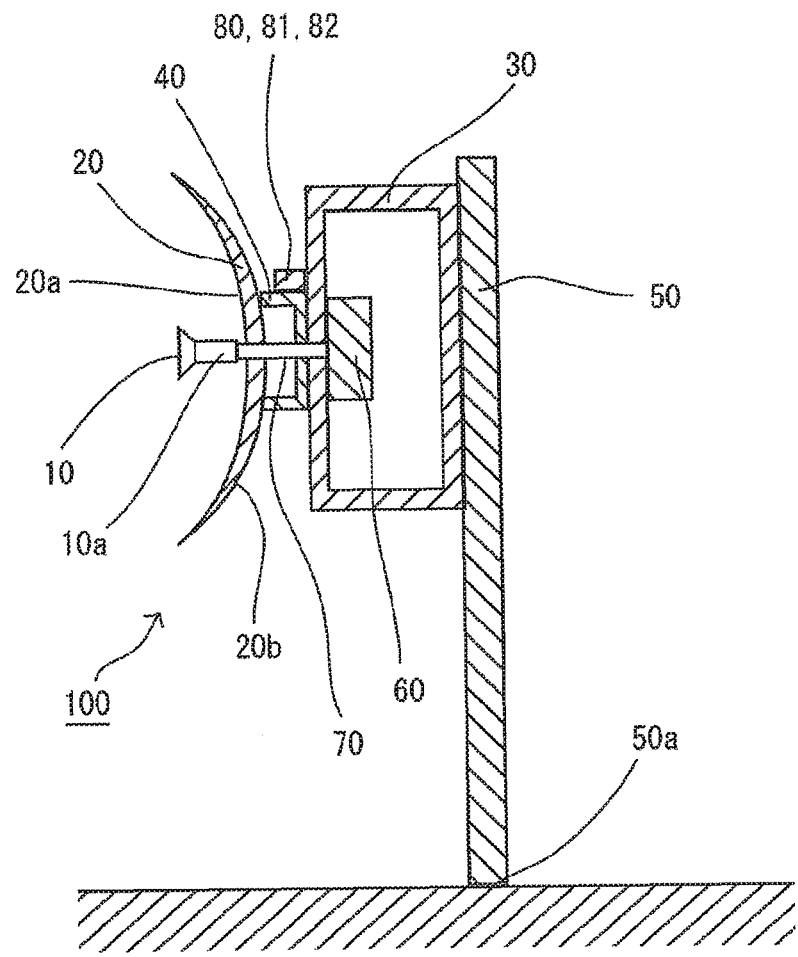
FIG. 1 is a cross-sectional side view showing an antenna device according to a first exemplary embodiment of the present invention.
Figure 2:
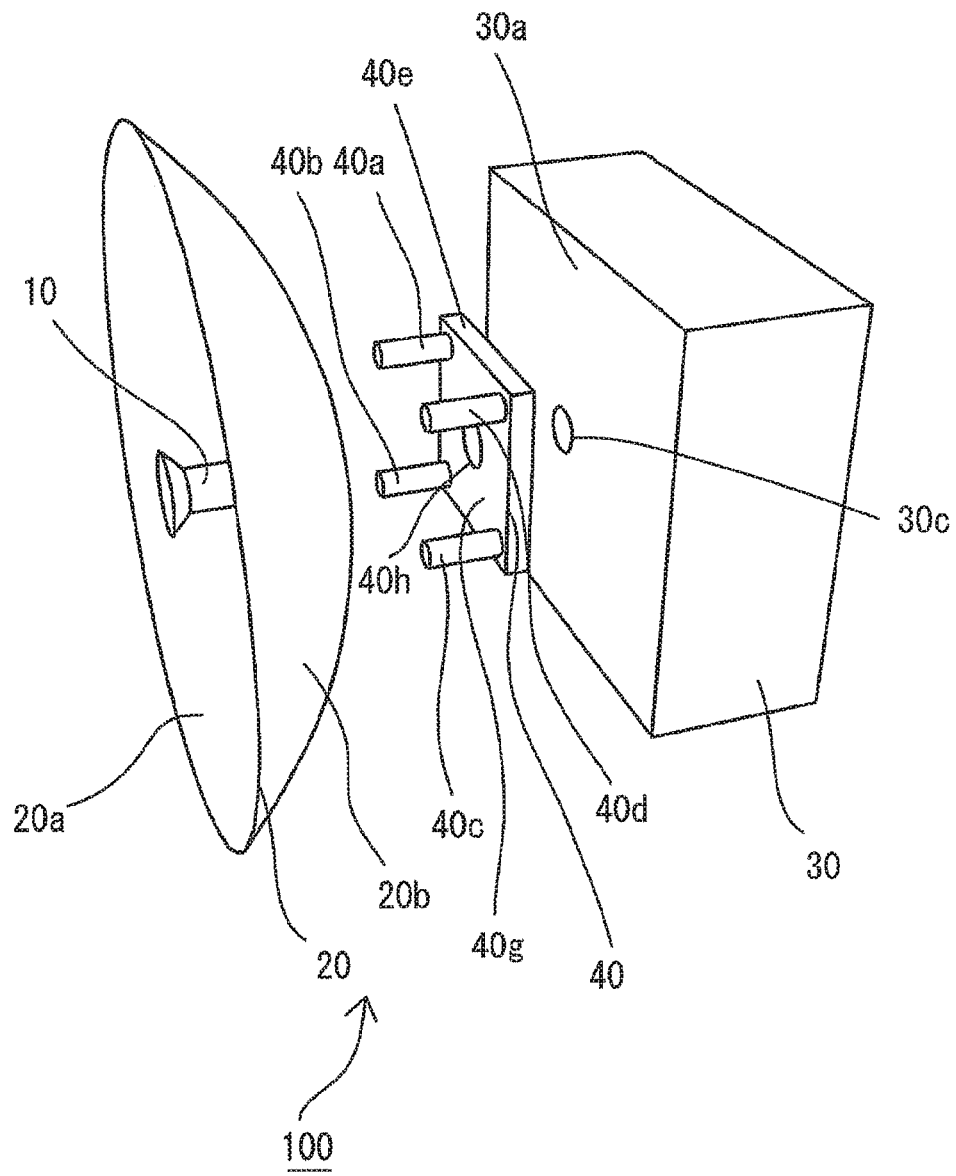
FIG. 2 is an exploded perspective view of the antenna device showing an angle adjustment means.

As shown in FIGS. 1 and 2, the antenna device 100 is mounted on a pole 50 whose base end 50a is fixedly installed on a floor. Specifically, a backside 30b of a housing 30 is fixedly installed on a middle of the pole 50. The housing 30 is a rectangular box that is rigid and resistant to deformation, for example. A transmitting and receiving circuit 60 that transmits and receives radio waves is housed and fixed in the housing 30. The housing 30 is a part of an outdoor device, for example. A backside 20b of an antenna member 20 is coupled to a front side 30a of the housing 30a though a coupling means 45, which is not shown.

The antenna member 20 is thereby coupled to the housing 30 in the way it is freely rotatable about the coupling means as the center of rotation in a certain angle range in the pitching and yawing directions. The antenna member 20 is a reflector member of a parabolic antenna, for example. A common universal joint may be used for the coupling means 45, for example.

A base end of a primary radiation means 10 is coupled to the transmitting and receiving circuit 60 through a waveguide 70 that guides radio waves, so that its main body 10a is placed in front of the front side 20a of the antenna member 20. The waveguide 70 is coupled to the transmitting and receiving circuit 60 through a hole 30c in the front side of the housing 30. In this example, the primary radiation means 10 can be regarded as being fixed to the housing 30.

The primary radiation means 10 and the antenna member 20 are not coupled to each other. Specifically, the antenna member 20 can freely rotate in a certain angle range in the pitching and yawing directions relative to the primary radiation means 10. An angle adjustment means 40 that adjusts the azimuth of the antenna member 20 is mounted between the backside of the antenna member 20 and the front side of the housing 30.

Referring to FIGS. 1 and 2, a backside 40f of a board 40e of the angle adjustment means 40 is fixed to the front side 30a of the housing 30. The angle adjustment means 40 has a plurality of actuators 40a, 40b, 40c and 40d at the four corner of a front side 40g of the board 40e. The board 40e has a hole 40h at the center, and the front side 30a of the housing 30 has a hole 30c. The angle adjustment means 40 is mounted on the housing 30 so that the waveguide 70 that is coupled to the primary radiation means 10 is inserted through the holes 40h and 30c, though not shown in FIG. 2.

The base ends of the actuators 40a, 40b, 40c and 40d are respectively coupled to the four corners of a front side 40g of the board 40e, and the front ends are respectively coupled to the backside 20b of the antenna member 20. Piezoelectric elements can be used for the actuators 40a, 40b, 40c and 40d. Each of the actuators 40a, 40b, 40c and 40d may be regarded as a rigid body in the state where they do not expand and contract.

Thus, by such coupling, the antenna member 20 can be regarded as being fixed to the housing 30 in the state where the actuators 40a, 40b, 40c and 40d do not expand and contract. Because the primary radiation means 10 is also fixed to the housing 30 in this state, the primary radiation means 10 does not move with respect to the antenna member 20.

When the actuators 40a, 40b, 40c and 40d are driven independently of one another, the antenna member 20 rotates about the coupling means 45 as the center of rotation in a certain angle range achieved in the stroke range of the actuators 40a, 40b, 40c and 40d, and the relative angle of the antenna member 20 to the primary radiation means 10 thereby changes.

By the above structure, at the time of transmission, the primary radiation means 10 emits radio waves guided from the transmitting and receiving circuit 60 from its front end to reflect the radio waves on the front side 20a of the antenna member 20. The antenna member 20 reflects the radio waves on the front side 20a of the antenna member 20, forms a transmission beam and transmits it as a transmission wave. At the time of reception, the antenna member 20 reflects radio waves on the front side 20a to concentrate the radio waves at the front end of the primary radiation means 10. The primary radiation means 10 guides the radio waves from the front end to the transmitting and receiving circuit 60 as a received wave. In addition, though not shown, a power supply device that supplies power to the antenna device 100 is placed.

The functional configuration of the antenna device 100 is described hereinafter with reference to the drawings.

Figure 3A:
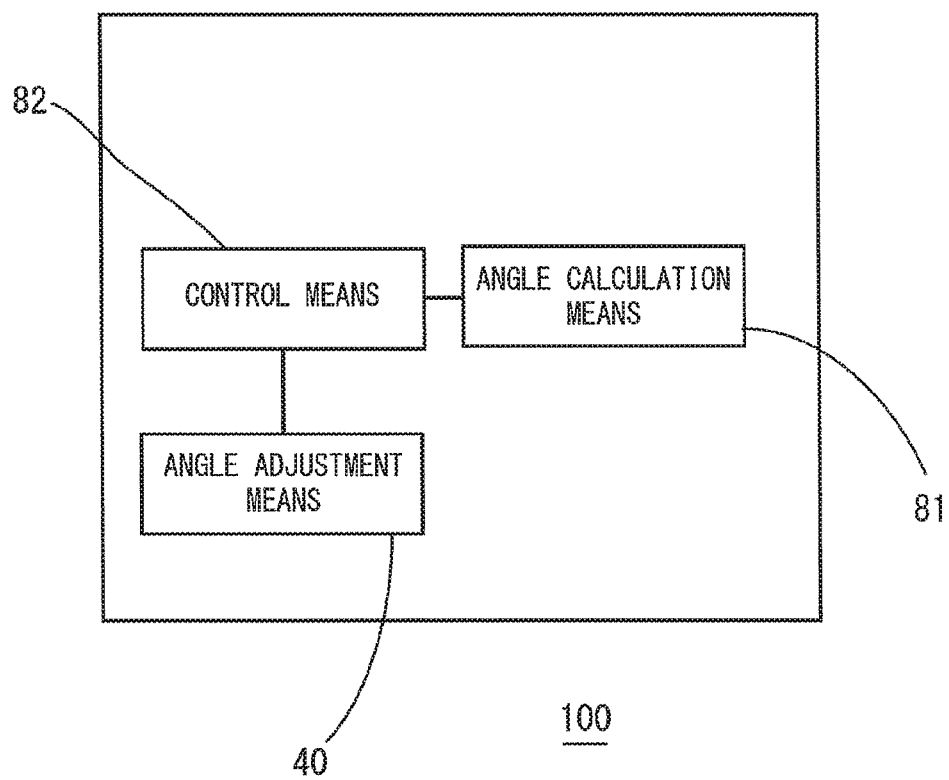
FIG. 3A is a functional block diagram of the antenna device.

FIG. 3A is a functional block diagram of the antenna device 100. The displacement of the azimuth that has occurred in the primary radiation means 10 is input to an angle calculation means 81. The displacement of the azimuth may be input by an operator or may be calculated based on data detected using a detection means. For the displacement of the azimuth having occurred in the primary radiation means 1, the angle calculation means 81 calculates an azimuth θ to be corrected of the transmission beam formed by the antenna member 20 and the relative angle of the antenna member 20 to the primary radiation means 10. This calculation can be used also for calculating an azimuth θ to be corrected for maintaining the reception level of a received wave and a relative angle θ1 of the antenna member 20 to the primary radiation means 10.

The azimuth θ to be corrected is calculated based on the input displacement of the azimuth. Because the antenna device 100 has a structure in which the antenna member 20 is at an angle with respect to the primary radiation means 10, the calculated azimuth θ to be corrected cannot be applied as it is as the rotation angle of the antenna member 20.

The relative angle θ1 is calculated by the following equation (1).

$$\theta 1 = \tfrac{1}{2} \times \theta \qquad (1)$$

Figure 4:
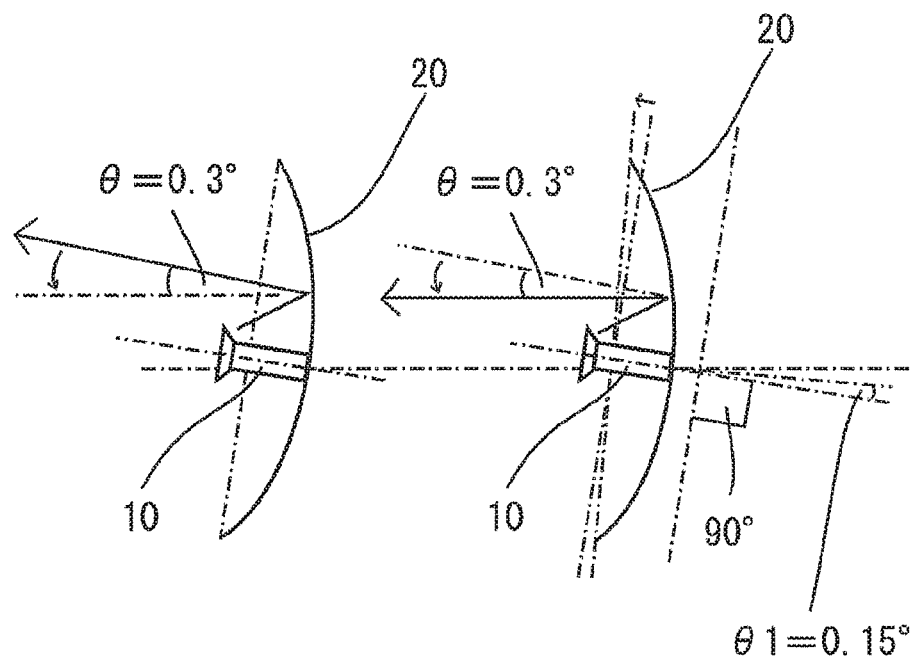
FIG. 4 is a view showing the relationship between an azimuth of a transmission beam to be corrected and an angle (relative angle) to rotate an antenna member relative to a primary radiation means.

Specifically, the relative angle θ1 is ½ of the azimuth θ to be corrected of a transmission beam. This is to deviate the emitting surface (front side 20a) of the antenna member 20 from a focal point of radio waves emitted from the primary radiation means 10. For example, as shown in FIG. 4, the relative angle for shifting the azimuth of a transmission beam by 0.3° is 0.15°. Thus, when the antenna member 20 rotates by the relative angle, the azimuth of the transmission beam rotates by an angle that is twice the relative angle. The angle calculation means 81 calculates the relative angle θ1 for each of the yawing and pitching directions.

Figure 3B:
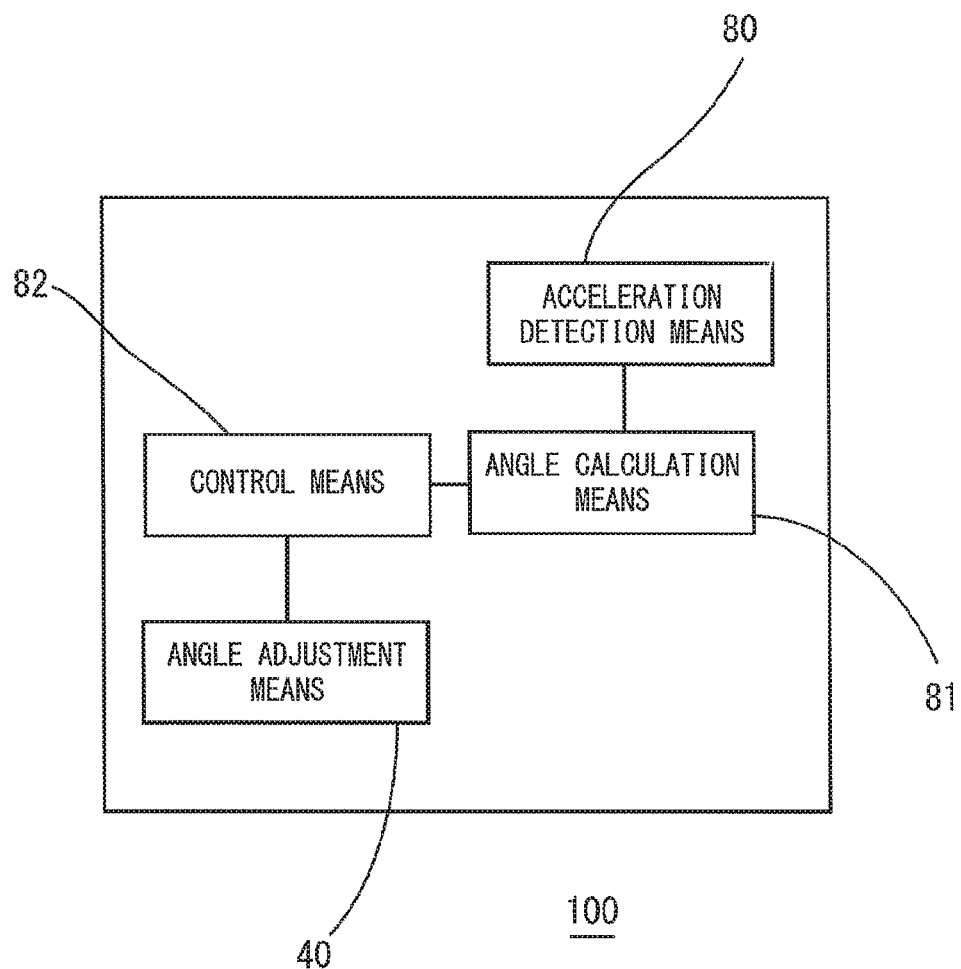
FIG. 3B is a functional block diagram of the antenna device in the case of using an acceleration detection means.

Acceleration that is occurring in the housing 30 at the input of the displacement of the azimuth may be detected, and the displacement of the azimuth may be calculated based on the acceleration. The displacement of the azimuth may be calculated using a known technique. Further, an acceleration detection means 80 may be mounted as a means of detecting acceleration. FIG. 3B is a functional block diagram of the antenna device 10 in the case of using the acceleration detection means 80. Although the acceleration detection means 80 is mounted on the housing 30, for example, it may be mounted on another part as long as the displacement of the azimuth can be calculated.

The acceleration detection means 80 detects acceleration occurring in the housing 30, for example. The acceleration detection means 80 is mounted outside the housing 30, such as the board 40e of the angle adjustment means 40 that is fixed to the housing 30, for example. The fact that acceleration is occurring in the housing 30 indicates the state where the pole 50 is moving, like shaking, due to environmental factors such as high winds or a shake, for example.

For the detection of acceleration, an acceleration sensor that is mounted on the acceleration detection means 80 may be used. For example, an acceleration sensor for mobile phones, a tilt sensor or the like may be used for the acceleration sensor. Any sensor may be used for the acceleration sensor as long as it can detect displacement, a yawing angle, a pitching and the like. Further, instead of detecting acceleration, the tilt of the housing 30 may be directly detected. Besides, the tilt of the housing 30 may be detected by imaging with a video camera or by using optical measurement.

In the state where acceleration is detected, the direction of the transmission beam formed by the antenna member 20 changes. Then, the angle calculation means 81 calculates the azimuth θ to be corrected (displacement of the azimuth) using a known technique based on input acceleration data that has been detected and output by the acceleration detection means 80. After that, the angle calculation means 81 calculates the relative angle to be formed between the primary radiation means 10 and the antenna member 20 based on the displacement of the azimuth.

A control means 82 receives relative angle data that has been calculated and output by the angle calculation means and 81, drives the actuators 40a, 40b, 40c and 40d of the angle adjustment means 40 based on the relative angle data to thereby change the direction of the antenna member 20. Specifically, the control means 82 controls the angle adjustment means 40 to change the relative angle of the antenna member 20 to the primary radiation means 10 in the direction of the azimuth to be corrected of a transmission beam, or in the direction of the azimuth to be corrected so as not to cause a decrease in the reception level of received waves.

At this time, because the primary radiation means 10 is fixed and coupled to the housing 30 in the antenna device 100, the antenna member 20 is rotated by the calculated relative angle in order to have the relative angle. The control means 82 places a limitation on the angle of shifting the transmission beam, which is the value of the relative angle, and thereby prevents the disconnection of communication when the input displacement of the azimuth exceeds the limitation, when the acceleration detection means 80 incorrectly detects acceleration and the like.

The control means 82 makes angle adjustment in each of the yawing and pitching directions. For example, to reduce the azimuth of a transmission beam by θ in the pitching direction, the control means 82 controls to expand the actuator the actuators 40a and 40d mounted above and thereby rotates the antenna member 20 downward by the relative angle θ1 described above.

The control means 82 thereby controls the angle adjustment means 40 to maintain the direction of the transmission beam in a certain range and maintain the level of transmission waves transmitted by the transmitting and receiving circuit 60 at the time of transmission. Further, the control means 82 controls the angle adjustment means 40 to maintain the reception level of received waves in a certain range at the time of reception. The control means 82 performs yawing angle control of the antenna member 20 in the same manner. The control means 82 is mounted on the acceleration detection means 80, for example.

Figure 5:
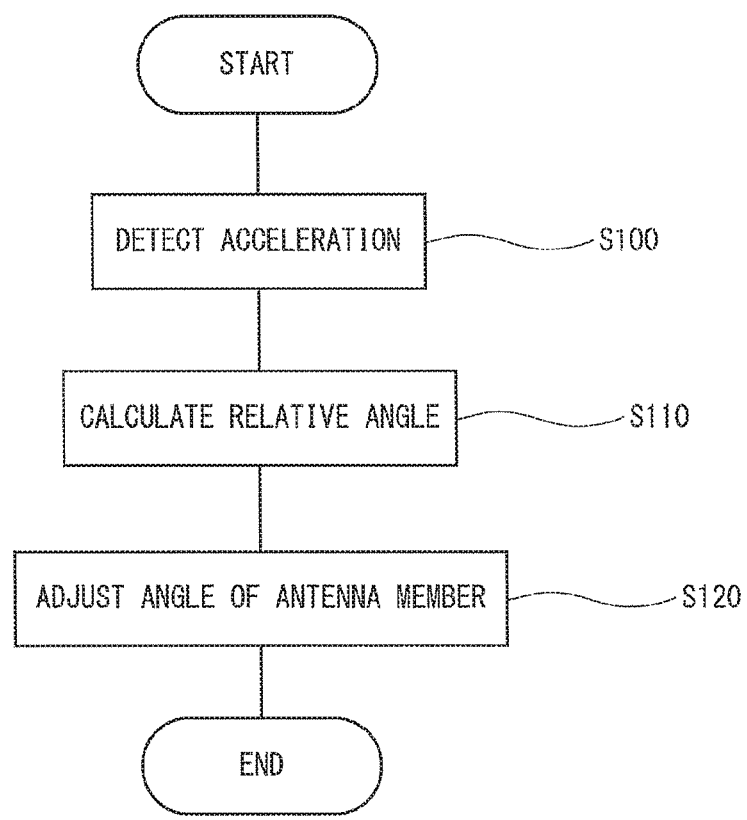
FIG. 5 is a flowchart showing an operation of the antenna device.

The operation of the antenna device 100 is described hereinafter with reference to FIG. 5.

Acceleration occurs in the housing 30 to tilt the housing 30 due to environmental factors such as high winds on the antenna member 20 or shaking of the floor transmitted from the base end 50a of the pole 50.

The acceleration detection means 80 detects the acceleration (S100). The acceleration detection means 80 inputs the detected acceleration data to the angle calculation means 81. Based on the input acceleration data, the angle calculation means 81 calculates the relative angle of the antenna member 20 to the primary radiation means 10 for maintaining the direction of a transmission beam formed by the antenna member 20 or maintaining the reception level of received waves (S110).

The angle calculation means 81 inputs the calculated relative angle data to the control means 82. The control means 82 controls the angle adjustment means 40 based on the input relative angle data (S120). By the above process, the antenna device 100 adjusts the azimuth of the antenna member 20 at the time of transmission and reception.

The above-described process is used for the direction control of one axis of the antenna member 20. Thus, the same processing may be performed for the direction control of another axis. For the direction control of a plurality of axes, the above-described process may be performed sequentially or performed in parallel.

As described above, the antenna device 100 can adjust the position of the antenna member 20 highly accurately and maintain a high transmission and reception level without disconnecting the communication even under the environment like high winds or a disaster where the azimuth of the antenna changes. Because the antenna device 100 uses piezoelectric elements for the angle adjustment of the antenna member 20, positioning of the antenna member 20 can be done at infinite resolution.

Further, because the antenna device 100 uses piezoelectric elements, it is possible to reduce the power consumption during driving. The antenna device 100 can thereby operate with power supply from the existing power supply device. Furthermore, because the antenna device 100 uses piezoelectric elements, it is possible to correct the angle of the antenna member 20 immediately for the tilt angle of the housing 30. In addition, because piezoelectric elements have only few mechanical parts, the antenna device 100 features maintenance-free operation.

Further, because the antenna device 100 adjusts the angle of the antenna member 20 based on acceleration of the housing 30 in the above structure, there is no need for a mechanism of detecting the level of received waves received from an opposite antenna, which allows simplification of a device structure. Further, the antenna device 100 can use the existing acceleration sensor for the detection of acceleration, which allows the device to be built at low costs. Furthermore, if the primary radiation means 10, the antenna member 20, the angle adjustment means 40 and the acceleration detection means 80 are integrated as an antenna unit, it can be mounted on another existing housing, which enables the replacement of the antenna unit.

Second Exemplary Embodiment

An antenna device 200 according to a second exemplary embodiment of the present invention is described hereinafter with reference to the drawings.

The antenna device 200 according to this exemplary embodiment has the same structure as the one according to the first exemplary embodiment, and the same reference symbols are used for the description of the same elements, and the description of a redundant part is omitted.

In the first exemplary embodiment, the angle calculation means 81 calculates the tilt angle of the housing 30 based on the acceleration detected by the acceleration detection means 80 and uses the tilt angle for the calculation of the relative angle. However, in the actual environment where the antenna device 100 is placed, the detected acceleration contains noise. As described earlier, because the angle calculation means 81 calculates the tilt angle by performing integration of acceleration, there is a problem that, if integration of noise level acceleration is performed repeatedly, errors are accumulated in calculation results.

Figure 6:
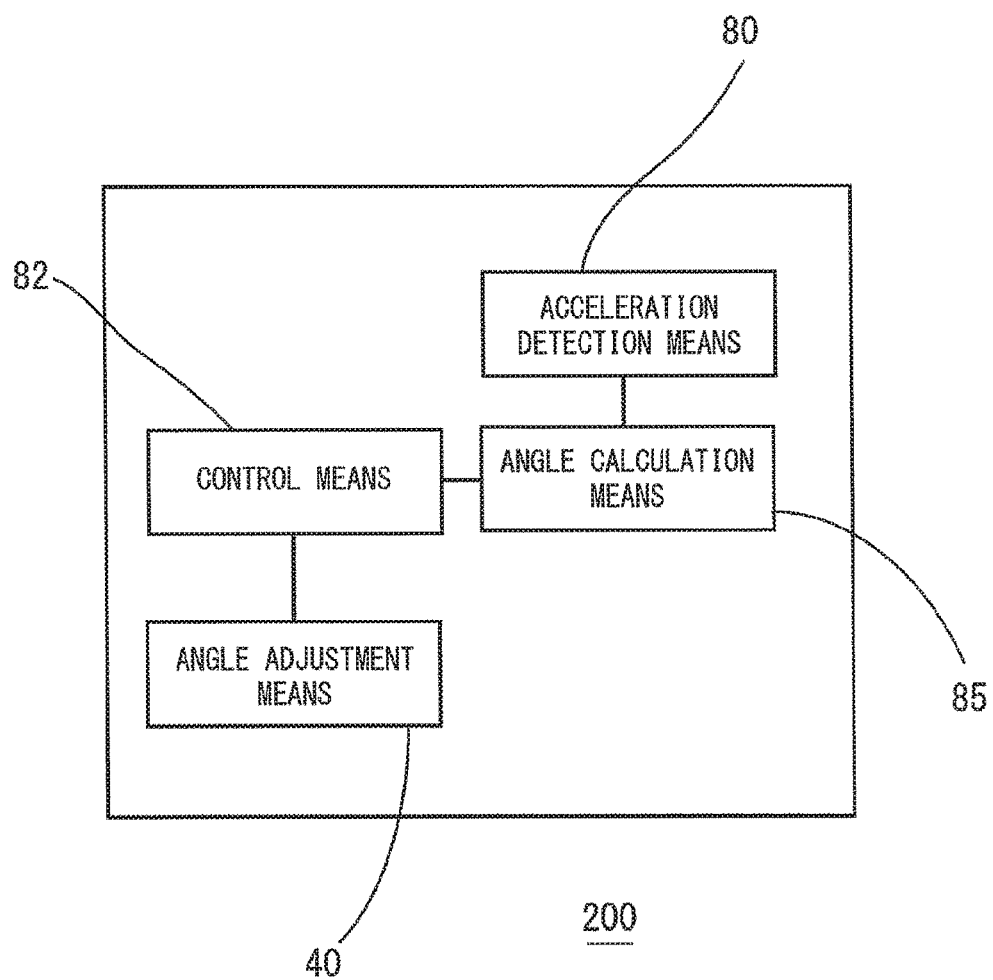
FIG. 6 is a functional block diagram of an antenna device according to a second exemplary embodiment of the present invention.

FIG. 6 is a functional block diagram of the antenna device 200. In the antenna device 200, an angle calculation means 85 is different from the angle calculation means 81 of the antenna device 100.

The angle calculation means 85 is described hereinbelow.

The angle calculation means 85 receives acceleration data that has been detected and output by the acceleration detection means 80. Based on the acceleration data, the angle calculation means 85 calculates the azimuth to be corrected of a transmission beam formed by the antenna member 20 and calculates a relative angle. In this process, the angle calculation means 85 calculates the tilt angle of the housing 30 by performing integration of the acceleration data, and uses it for the calculation of the relative angle.

When performing the integration, as a measure against noise, the angle calculation means 85 outputs a calculation result of the azimuth when acceleration data is equal to or greater than a predetermined threshold a and does not output a calculation result of the azimuth when acceleration data is less than the threshold a. Specifically, the angle calculation means 85 sets a dead zone for output data of the acceleration sensor of the acceleration detection means 80 in the output of a calculation result.

The angle calculation means 85 further samples the acceleration data output by the acceleration detection means 80 for a certain period of time. When the fluctuation of a plurality of sampled acceleration data values is within a threshold b, the angle calculation means 85 acquires the fluctuation data value as an offset value for acceleration sensor output zero and offsets the output value of the acceleration detection means 80. Specifically, the angle calculation means 85 samples the detected acceleration for a certain period of time, calculates the offset value of the tilt angle of the housing 30, and offsets the tilt angle.

Figure 7:
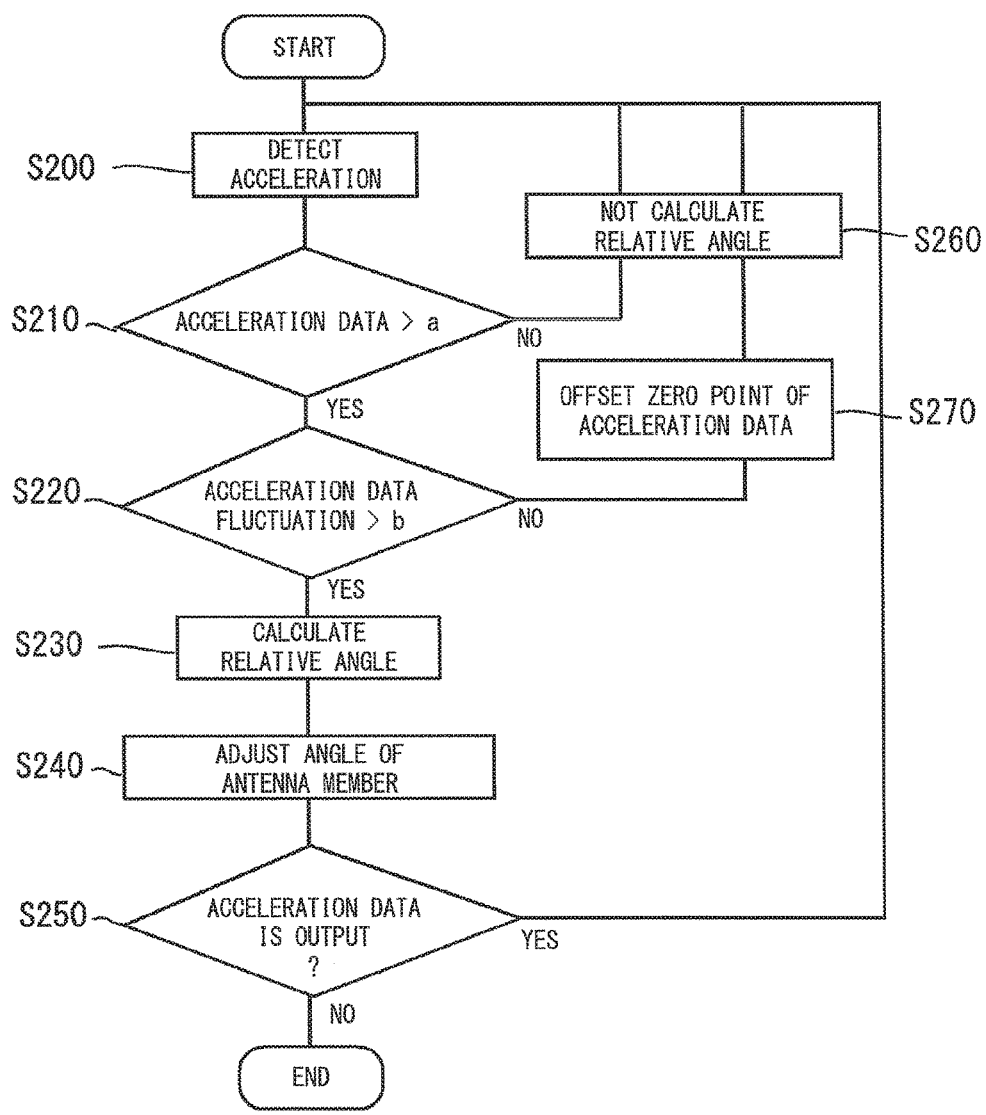
FIG. 7 is a flowchart showing an operation of the antenna device according to the second exemplary embodiment of the present invention.

The operation of the antenna device 200 is described hereinafter with reference to FIG. 7.

The angle calculation means 85 acquires acceleration data output by the acceleration detection means 80 (S200). The angle calculation means 85 determines a dead zone as to whether the acceleration data is greater than a specified threshold a (S210). When a result of the determination is YES (YES in S210), the angle calculation means 85 determines whether the fluctuation of a plurality of sampled values of acceleration data during a certain period is greater than a specified threshold b (S220).

When a result of the determination is less than the threshold b (YES in S220), the angle calculation means 85 calculates the relative angle of the antenna member 20 to the primary radiation means 10 to rotate the antenna member 20 (S230). The angle calculation means 85 outputs the relative angle data to the control means 82 and, based on the relative angle data, the control means 82 controls the angle adjustment means 40 to rotate the antenna member 20 so as to maintain the direction of the transmission beam within a certain range (S240). When the acceleration detection means 80 does not output the acceleration data (NO in S250), the angle calculation means 85 ends the process.

When a result of the determination of Step S210 is NO (NO in S210), which is when the output value of acceleration data is equal to or less than the threshold a, the angle calculation means 85 does not calculate the relative angle (S260), enters standby mode for the input of acceleration data, and then returns to Step S200.

When a result of the determination of Step S220 is less than the threshold b (NO in S220), which is when the fluctuation of the output value of acceleration data is equal to or less than the threshold b, the angle calculation means 85 offsets the zero point of the output value of acceleration data of the acceleration detection means 80 (S270) and then proceeds to Step S260.

When the acceleration detection means 80 outputs the acceleration data (YES in S250), the angle calculation means 85 proceeds to Step S200. The above-described process is used for the direction control of one axis of the antenna member 20. Thus, the same processing may be performed for the direction control of another axis. For the direction control of a plurality of axes, the above-described process may be performed sequentially or performed in parallel.

As described above, the antenna device 200 can remove noise of acceleration data output by the acceleration detection means 80 and control the azimuth of the antenna member 20 highly accurately and maintain a high transmission and reception level without disconnecting the communication even under the environment like high winds or a disaster to shake the antenna member 20. Further, the antenna device 200 samples acceleration data output by the acceleration detection means 80 for a certain period of time and can thereby offset the zero point of the acceleration data.

Other Exemplary Embodiments

The above exemplary embodiments are described by way of illustration only, and an alternative example as described below is also within the scope of the present invention.

In the antenna device 100 according to the first exemplary embodiment, the relative angle of the antenna member 20 to the primary radiation means 10 is adjusted by rotating the antenna member 20 by the angle adjustment means 40. Alternatively, the antenna member 20 may be fixed to the housing 30, and the relative angle of the primary radiation means 10 to the antenna member 20 may be adjusted by rotating the primary radiation means 10 with respect to the housing 30 by the angle adjustment means 40. In this case, a flexible waveguide may be used for the waveguide 70 that couples the transmitting and receiving circuit 60 and the primary radiation means 10.

In this case, because the primary radiation means 10 is lighter and less subject to winds than the antenna member 20, the antenna device 100 can drive the angle adjustment means 40 with less power.

Figure 8:
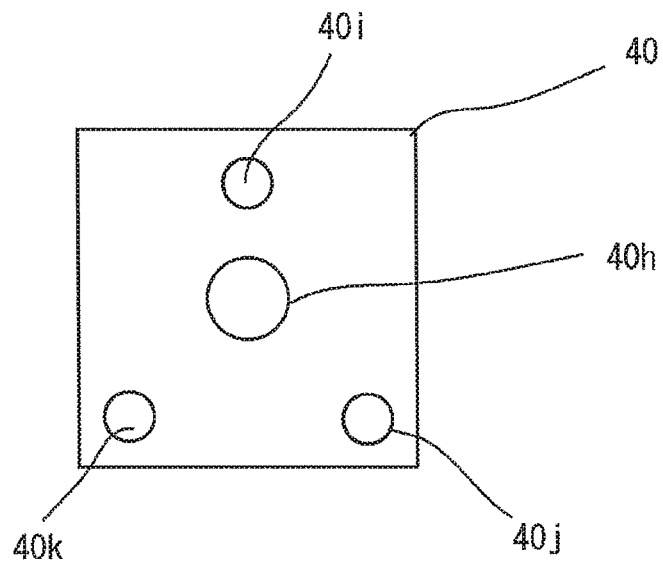
FIG. 8 is a view showing an alternative example of an angle adjustment means.
Figure 9:
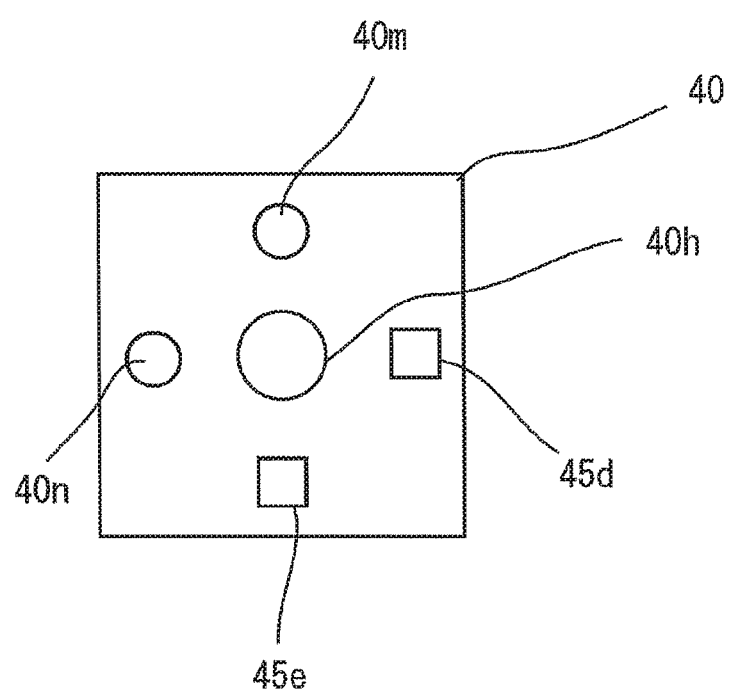
FIG. 9 is a view showing an alternative example of an angle adjustment means.

In the antenna device 100, the angle adjustment means 40 uses the four actuators 40a to 40d. Various patterns, not limited to the number or the placement of those actuators 40a to 40d, may be used for the angle adjustment of the antenna member. For example, the azimuth control of the antenna member 20 in the yawing and pitching directions may be performed with three actuators 40i, 40j and 40k as shown in FIG. 8. Alternatively, as shown in FIG. 9, actuators 40m and 40n may be placed in one of a pair of mounting positions arranged opposite to each other at the positions near opposite sides of the board 40e, and rotatable coupling means 45d and 45e may be placed in the other one of the pair of mounting positions.

In this case, the number of actuators can be reduced, and the antenna device 100 can drive the angle adjustment means 40 with still less power.

Figure 10:
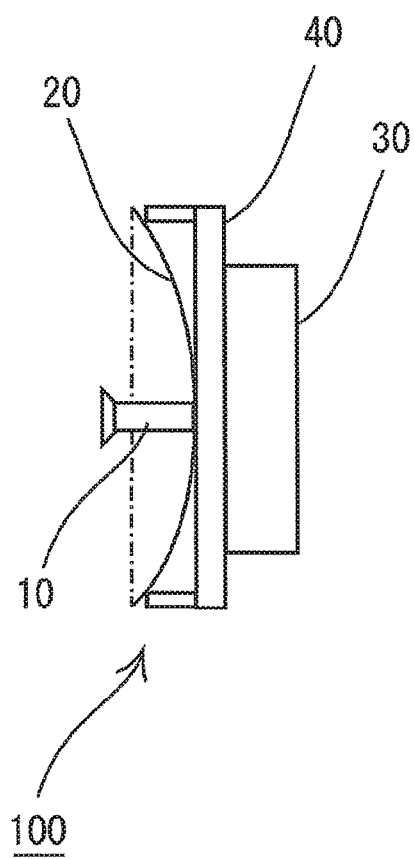
FIG. 10 is a view showing an alternative example of an angle adjustment means.

In the first exemplary embodiment, the actuators 40a to 40d of the angle adjustment means 40 are mounted near the center of the antenna member 20. If the mounting positions of the actuators are closer to the edges of the antenna member 20 as shown in FIG. 10, the actuators can rotate the antenna member 20 with less driving power.

In this case, the antenna device 100 can drive the angle adjustment means 40 with the actuators with still less power.

In the above exemplary embodiment, a universal joint is used for the coupling means 45 between the antenna member 20 and the housing 30 as an example. Instead of a universal joint, an elastic body such as a meal plate may be used for the coupling means 45. Further, a part near the mounting position of the antenna unit 20 may be formed to be elastic.

In this case, by using an elastic body such as a meal plate for the coupling means 45, it is possible to prevent the rotating mechanism of the antenna member 20 from being locked due to corrosion of a movable part, which enhances the maintenance-free operation of the antenna device 100.

In the second exemplary embodiment, the antenna device 200 detects the fluctuation of acceleration data by sampling and offsets the zero point of the acceleration data. A change in the tilt of the housing 30 over time may be detected by changing the sampling technique. Specifically, the tilt of the pole 50 caused by ground subsidence or the like may be detected.

In this case, the antenna device 200 can detect a change in the tilt of the housing 30 over time.

A monitoring system that monitors the antenna device 100 or 200 in real time may be implemented by connecting a management terminal to a network to which the antenna device 100 or the antenna device 200 is connected. The management terminal may detect a disaster to help in recovery, or it may remote control the antenna device 100 or the antenna device 200.

Various types of motors may be used for the angle adjustment means as long as the motor can rotate the antenna member 20. For example, various types of linear motors or ultrasonic motors may be used. In the case of using a linear motor, the track of the motor's rotation is preferably a circular arc.

In the control means 82, the angle calculation means 81 and the acceleration detection means 80 and 85 may be dedicated hardware composed of various logical elements. Alternatively, the functions of the functional units of the control means 82 may be implemented by incorporating a given program into a computer having a CPU (Central Processing Device), a memory (storage device) and the like. The above-described functional units may be implemented by installing an antenna orientation adjustment program to the memory in the computer having the CPU and the memory through a communication means such as the Internet or a nonvolatile recording medium such as a CD-ROM or a memory card and causing the CPU or the like to operate with the installed program. The program may be installed by directly inserting the memory card, the CD-ROM or the like into the computer or externally connecting equipment that reads such as a storage medium to the computer. Further the program may be supplied and installed through communication by connecting a wired or wireless communication line to the computer.

It should be noted that the present invention is not limited to the above-described exemplary embodiment and may be varied in many ways within the scope of the present invention.

For example, the whole or part of the exemplary embodiments disclosed above can be described as, but not limited to, the following supplementary notes.

(Supplementary Note 1)

An antenna device comprising:

a primary radiation means coupled to a transmitting and receiving circuit that transmits and receives radio waves through a waveguide that guides radio waves, for guiding and emitting radio waves from the transmitting and receiving circuit at transmission, and guiding radio waves to the transmitting and receiving circuit at reception;

an antenna member coupled to a housing that contains the transmitting and receiving circuit, for reflecting radio waves emitted by the primary radiation means and forming a transmission beam at transmission, and reflecting received waves on the primary radiation means at reception;

an angle adjustment means mounted on the housing, for changing a relative angle between the primary radiation means and the antenna member;

an angle calculation means for calculating the relative angle to be formed between the primary radiation means and the antenna member for displacement of an azimuth occurring in the primary radiation means; and a control means for controlling the angle adjustment means based on the calculated relative angle.

(Supplementary Note 2)

The antenna device according to Supplementary note 1, wherein the angle adjustment means includes a plurality of actuators placed opposite to one another at positions near a center of the antenna member.

(Supplementary Note 3)

The antenna device according to Supplementary note 1, wherein the angle adjustment means includes a plurality of actuators placed opposite to one another at positions near edges of the antenna member.

(Supplementary Note 4)

The antenna device according to any one of Supplementary notes 1 to 3, comprising:

a coupling member for coupling the antenna member rotatably to the housing, wherein the coupling member is made of an elastic body.

(Supplementary Note 5)

A monitor device that monitors or controls the antenna device according to any one of Supplementary notes 1 to 4 connected to a network by a terminal connected to the network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-27795, filed on Feb. 17, 2014, the disclosure of which is incorporated herein in its entirety by reference.

REFERENCE SIGNS LIST

10 PRIMARY RADIATION MEANS
10a MAIN BODY
20 ANTENNA MEMBER
20a FRONT SIDE
20b BACKSIDE
30 HOUSING
30a FRONT SIDE
30b BACKSIDE
30c HOLE
40 ANGLE ADJUSTMENT MEANS
40 ANGLE ADJUSTMENT MEANS
40a, b, c, d, i, j, k, m, n ACTUATOR
40e BOARD
40f BACKSIDE
40g FRONT SIDE
40h HOLE
45 COUPLING MEANS
45d, e COUPLING MEANS
50 POLE
50a BASE END
60 TRANSMITTING AND RECEIVING CIRCUIT
70 WAVEGUIDE
80 ACCELERATION DETECTION MEANS
81 ANGLE CALCULATION MEANS
82 CONTROL MEANS
85 ANGLE CALCULATION MEANS
100 ANTENNA DEVICE
200 ANTENNA DEVICE

The invention claimed is:

1. An antenna device comprising:
a primary radiator for guiding and emitting radio waves at transmission, and guiding radio waves at reception;
an antenna member for reflecting radio waves emitted by the primary radiator and forming a transmission beam at transmission, and reflecting received waves on the primary radiator at reception;
an angle adjuster for changing a relative angle between the primary radiator and the antenna member, the angle adjuster includes a piezoelectric element;
an angle calculator for calculating the relative angle to be formed between the primary radiator and the antenna member for displacement of an azimuth occurring in the primary radiator;
a controller for controlling the angle adjuster based on the calculated relative angle; and
an acceleration detector for detecting acceleration occurring in a housing on which the angle adjuster is mounted,
wherein the angle calculator calculates the displacement of the azimuth based on the detected acceleration, and
wherein the acceleration detector is mounted on the housing.

2. The antenna device according to claim 1, wherein the angle adjuster rotates the antenna member to change the relative angle to the primary radiator.

3. The antenna device according to claim 1, wherein the angle adjuster rotates the primary radiator to change the relative angle to the antenna member.

4. The antenna device according to claim 1, wherein the angle calculator calculates the relative angle when the detected acceleration is equal to or greater than a specified threshold.

5. The antenna device according to claim 1, wherein the angle calculator samples the detected acceleration for a certain period of time, and calculates an offset value of a zero point of a tilt angle of the housing.

6. A control method of an antenna device including a primary radiator for guiding and emitting radio waves at transmission, and guiding radio waves at reception, an antenna member for reflecting radio waves emitted by the primary radiator and forming a transmission beam at transmission, and reflecting received waves on the primary radiator at reception, an angle adjuster for changing a relative angle between the primary radiator and the antenna member, the angle adjuster including a piezoelectric element, an angle calculation means for calculating the relative angle to be formed between the primary radiator and the antenna member for displacement of an azimuth occurring in the primary radiator, and a controller for controlling the angle adjuster based on the calculated relative angle, the method comprising:
calculating the relative angle to be formed between the primary radiator and the antenna member for displacement of an azimuth occurring in the primary radiator; and
controlling the angle adjuster based on the calculated relative angle, wherein the antenna device further including an acceleration detector for detecting acceleration occurring in a housing on which the angle adjuster is mounted, wherein the method comprising: calculating the displacement of the azimuth based on the detected acceleration, and wherein the detected acceleration is acceleration occurring in the housing.

\* \* \* \* \*